US010116540B1

(12) United States Patent
Orovan et al.

(10) Patent No.: US 10,116,540 B1
(45) Date of Patent: Oct. 30, 2018

(54) SYSTEM, METHOD, AND COMPUTER PROGRAM FOR MANAGING DATA OBJECTS IN A MULTIPROCESSOR UNIT TELECOMMUNICATIONS NETWORK

(71) Applicant: Amdocs Software Systems Limited, Dublin (IE)

(72) Inventors: Ziv Orovan, Binyamina (IL); Nir Cohen, Tel-Mond (IL); Guy Turkenits, Kiryat Ono (IL); Vladimir Polonsky, Ramat-Gan (IL); Ari Erev, Even-Yehuda (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 300 days.

(21) Appl. No.: 14/218,800

(22) Filed: Mar. 18, 2014

Related U.S. Application Data

(60) Provisional application No. 61/807,807, filed on Apr. 3, 2013.

(51) Int. Cl.
*G06F 15/16* (2006.01)
*H04L 12/26* (2006.01)

(52) U.S. Cl.
CPC ............................... *H04L 43/0823* (2013.01)

(58) Field of Classification Search
CPC ...................................................... G06F 11/16
USPC ....................................................... 709/224
See application file for complete search history.

(56) References Cited

U.S. PATENT DOCUMENTS

| 2009/0112880 A1* | 4/2009 | Oliveira | .............. H04L 67/1097 |
| 2011/0191624 A1* | 8/2011 | Rodgers | .................. G06F 15/16 |
| | | | 714/4.11 |
| 2014/0025770 A1* | 1/2014 | Warfield | ........... G06F 15/17331 |
| | | | 709/213 |

* cited by examiner

*Primary Examiner* — Jason D Recek
*Assistant Examiner* — Clarence D McCray
(74) *Attorney, Agent, or Firm* — Zilka-Kotab, P.C.

(57) ABSTRACT

A system, method, and computer program product are provided for managing data objects in a multiprocessor unit telecommunications network. In use, a plurality of data objects associated with one or more data object events corresponding to a network are received. Further, each of the plurality of data objects are assigned to one of a plurality of processing modules for processing, based on a map. Additionally, the plurality of processing modules are monitored. Furthermore, it is determined whether each of the plurality of processing modules are available to process the plurality of data objects assigned thereto, based on the monitoring. In addition, at least one first data object of the plurality of data objects that is assigned to a first processing module of the plurality of processing modules is automatically reassigned to a second processing module of the plurality of processing modules, in response to determining the first processing module of the plurality of processing modules is not available to process the at least one first data object of the plurality of data objects assigned thereto. Further, the map is updated based on the reassigning, the updated map indicating the at least one first data object is assigned to the second processing module.

13 Claims, 7 Drawing Sheets

SYSTEM, METHOD, AND COMPUTER PROGRAM FOR MANAGING DATA OBJECTS IN A MULTIPROCESSOR UNIT TELECOMMUNICATIONS NETWORK

CLAIM OF PRIORITY

This application claims the benefit of U.S. Provisional Application No. 61/807,807, filed Apr. 3, 2013, the entire contents of which are incorporated herein by reference.

FIELD OF THE INVENTION

The present invention relates to networks, and more particularly to assigned processing responsibility to processing modules in such networks.

BACKGROUND

Telecommunications operators have on-line billing/rating systems that need to respond in near real-time to events generated by an associated telephony network. Since the rating system is part of the telephone call-path, the rating system should be highly available. For example, the rating system should be available to respond to the event within a very short response time. Furthermore, the rating system should ensure data reliability such that each rated event, as well as customer balance, is saved (persisted) by the system. There is thus a need for addressing these and/or other issues associated with the prior art.

SUMMARY

A system, method, and computer program product are provided for managing data objects in a multiprocessor unit telecommunications network. In use, a plurality of data objects associated with one or more data object events corresponding to a network are received. Further, each of the plurality of data objects are assigned to one of a plurality of processing modules for processing, based on a map. Additionally, the plurality of processing modules are monitored. Furthermore, it is determined whether each of the plurality of processing modules are available to process the plurality of data objects assigned thereto, based on the monitoring. In addition, at least one first data object of the plurality of data objects that is assigned to a first processing module of the plurality of processing modules is automatically reassigned to a second processing module of the plurality of processing modules, in response to determining the first processing module of the plurality of processing modules is not available to process the at least one first data object of the plurality of data objects assigned thereto. Further, the map is updated based on the reassigning, the updated map indicating the at least one first data object is assigned to the second processing module.

DETAILED DESCRIPTION

Figure 1:
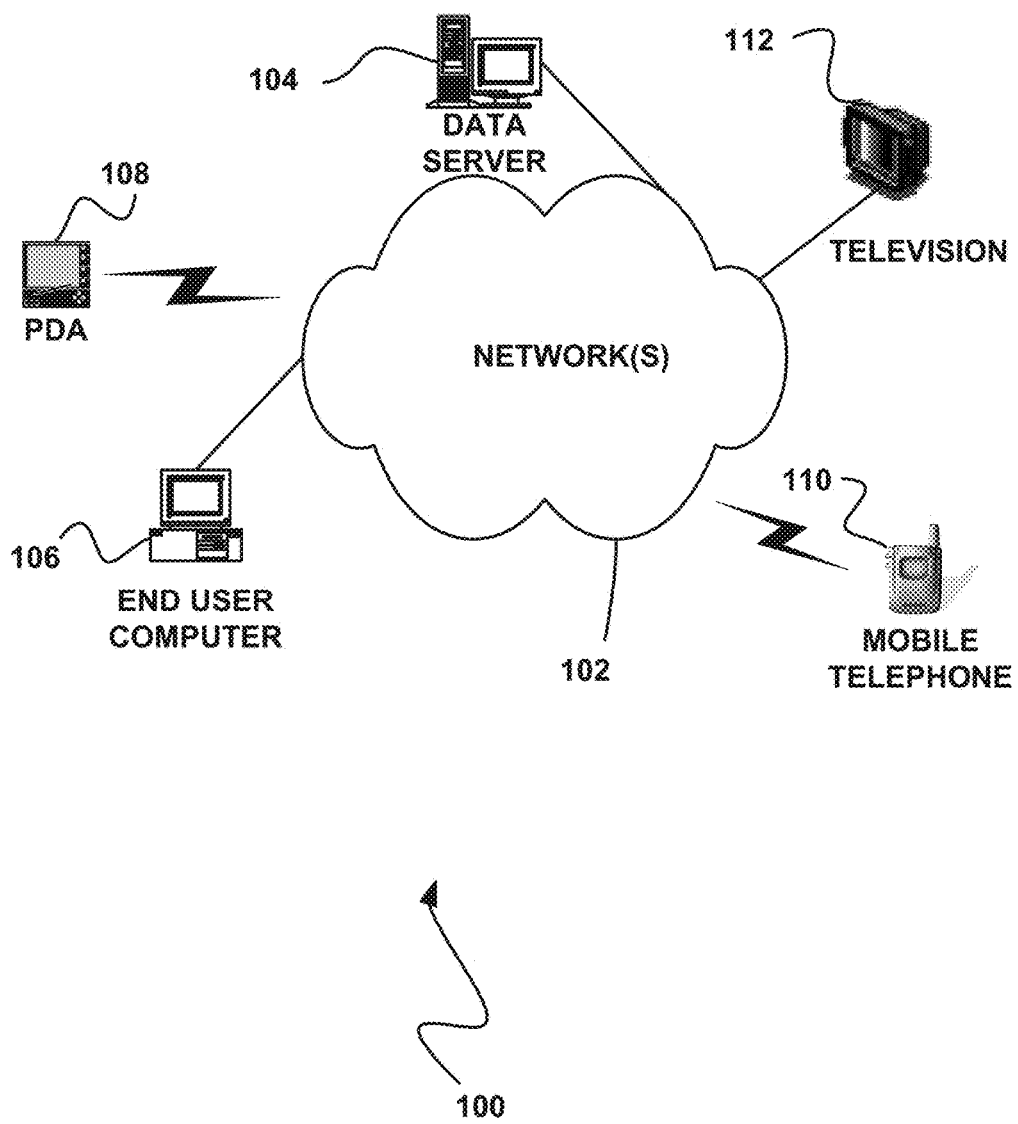
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
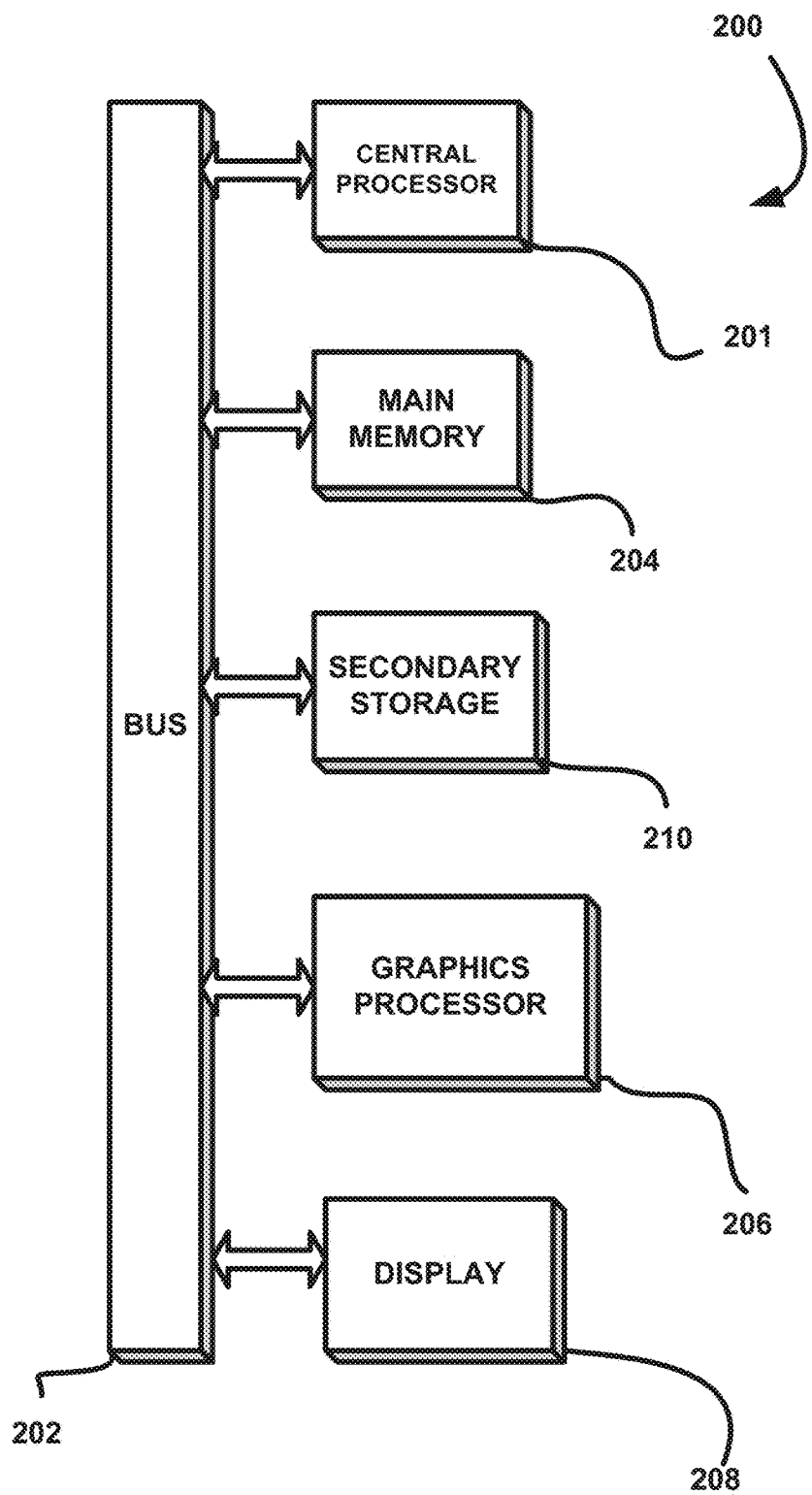
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also optionally includes a graphics processor 206 and a display 208.

The system 200 may also include a secondary storage 210. The secondary storage 210 includes, for example, a hard disk drive and/or a removable storage drive, representing a floppy disk drive, an optional magnetic tape drive, an optional compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
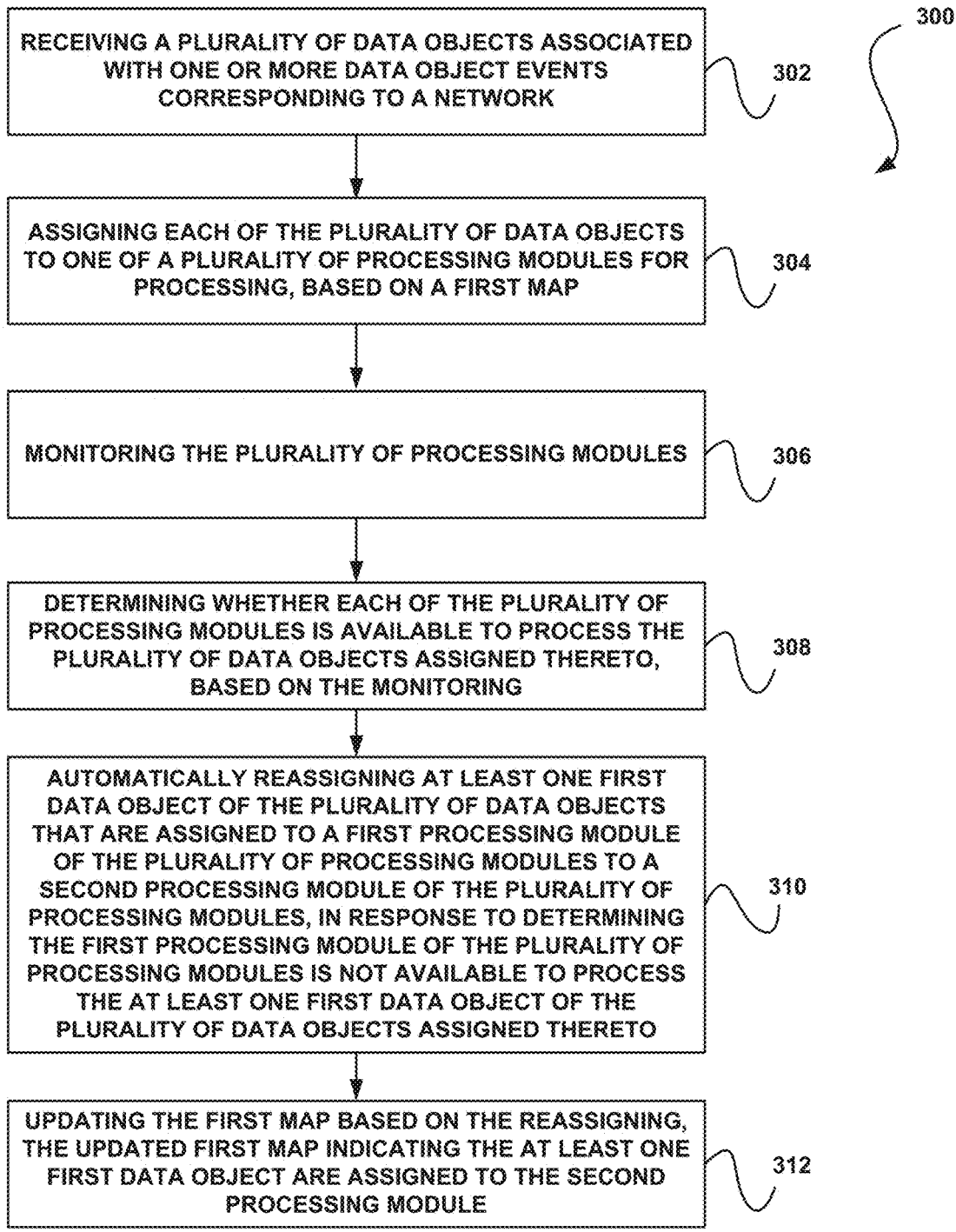
FIG. 3 illustrates a method for managing data objects in a multiprocessor unit telecommunications network, in accordance with one embodiment.

FIG. 3 illustrates a method 300 for managing data objects in a multiprocessor unit telecommunications network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a plurality of data objects associated with one or more data object events corresponding to a network are received. See operation 302. In the context of the present description, a data object may refer to any type of data. For example, in various embodiments, the data object may include a data structure, a string, a variable, a function, a table, and/or any other type of data.

In one embodiment, the data objects may be received by one or more network elements. The network elements may include any device associated with the network, including external clients, mobile devices, servers, computers, and/or any other type of device. In addition, the network may include any type of network. For example, in one embodiment, the network may include a telecommunications network (e.g. a consumer telecommunications network, etc.).

Further, the data object events may include any type of event associated with the data object. For example, in one embodiment, the data object event may include an event that creates the data object. In another embodiment, the data object event may include an event that utilizes one or more of the data objects.

As shown further in FIG. 3, each of the plurality of data objects are assigned to one of a plurality of processing modules for processing, based on a map. See operation 304. The processing modules may include any type of device and/or module capable of processing data. For example, in one embodiment, the processing modules may include a plurality of servers. In another embodiment, the processing modules may include a plurality of processing units.

The map may include any mapping and/or data structure capable of being used to map a processing module to a data object. For example, in one embodiment, the map may include assignments indicating each of the data objects that are assigned to each of the processing modules for processing.

Additionally, the plurality of processing modules are monitored. See operation 306. In one embodiment, monitoring the plurality of processing modules may include monitoring each of the plurality of processing modules for at least one failure.

In another embodiment, monitoring the plurality of processing modules may include monitoring each of the plurality of processing modules to determine whether the processing modules have entered an inactive state. In another embodiment, monitoring the plurality of processing modules may include monitoring each of the plurality of processing modules to determine whether the processing modules are able to process data objects and/or data object events assigned thereto.

The health of the processing modules may be monitored utilizing a variety of techniques. For example, in one embodiment, monitoring the plurality of processing modules may include monitoring heartbeat messages associated with each of the plurality of processing modules. For example, each of the plurality of processing modules may send periodic heartbeat messages capable of being used, at least in part, to determine a health associated with each of the plurality of processing modules.

Additionally, in one embodiment, monitoring the plurality of processing modules may include monitoring applications associated with each of the plurality of processing modules for unexpected termination. In this case, if the monitored applications unexpectedly terminate, it may be determined that a particular processing module has encountered a failure.

In another embodiment, monitoring the plurality of processing modules may include monitoring connection status reports associated with each of the plurality of processing modules. In this case, if multiple connection status reports associated with one of the plurality of processing modules are received, it may be determined that the one of the plurality of processing modules has failed.

As another option, monitoring the plurality of processing modules may include sending a direct health-check message to one of the plurality of processing modules. In this case, if the one of the plurality of processing modules fails to respond to the direct health-check message within a predefined period of time, it may be determined that the one of the plurality of processing modules is inactive.

Based on the monitoring, it is determined whether each of the plurality of processing modules are available to process the plurality of data objects assigned thereto. See operation 308. In addition, at least one first data object of the plurality of data objects that are assigned to a first processing module of the plurality of processing modules is automatically reassigned to a second processing module of the plurality of processing modules, in response to determining the first processing module of the plurality of processing modules is not available to process the at least one first data object of the plurality of data objects assigned thereto. See operation 310.

In one embodiment, determining the first processing module of the plurality of processing modules is not available to process the at least one first data object of the plurality of data objects assigned thereto may include determining that the first processing module of the plurality of processing modules is too busy to process the at least one first data object of the plurality of data objects assigned thereto. For example, it may be determined that the first processing module is too busy in response to monitoring a load percentage and a memory usage associated with the first processing module.

As shown further in FIG. 3, the map is updated based on the reassigning, where the updated map indicates the at least one first data object are assigned to the second processing module. See operation 312. In this way, a backup processing module may process data objects and/or events that were assigned to a processing module that has failed. Moreover, the updated map may function to allow all of the processing modules to be aware of processing assignments, etc.

To ensure high-availability for each of the processing modules, the method 300 may be implemented for acquiring ownership for customer data (e.g. data objects) and by allowing a backup processing module to claim ownership of customer's data, thus providing the ability for the backup processing module to step-in and replace a failing processing module. Since the processing module itself may unexpectedly fail due to a hardware or a software failure, in one embodiment, the updated data object may be copied in real time to the in-memory data grid, which may keep the data object in the RAM of (at least) two additional physical hosts.

In one embodiment, the method 300 may further include maintaining at least one memory including the plurality of data objects. As an option, the at least one memory including the plurality of data objects may include an in-memory data grid for storing the plurality of data objects.

Further, in one embodiment, the second processing module may continuously process first data object events associated with the at least one first data object assigned thereto. In this case, the at least one first data object modified by the processing may be sent from the second processing module to the at least one memory. Responsive to sending the at least one first data object modified by the processing to the at least one memory, it may be determined whether the at least one first data object stored in the at least one memory are assigned to the second processing module.

If the at least one first data object is assigned to the second processing module, the at least one first data object modified by the processing may be stored in the at least one memory. Further, it may be determined whether the at least one first data object in the at least one memory was last accessed by the second processing module. In this case, if the at least one first data object in the at least one memory was last accessed by the second processing module the associated ownership will be updated and the at least one first data object modified by the processing may be stored in the at least one memory.

In one embodiment, the method 300 may be implemented by a system that has high-availability and short response time, by servicing each event based on data (e.g. customer state/balance, etc.), which may be cached in the Random Access Memory (RAM) of the processing modules, and by storing the processing result in an in-memory data grid.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
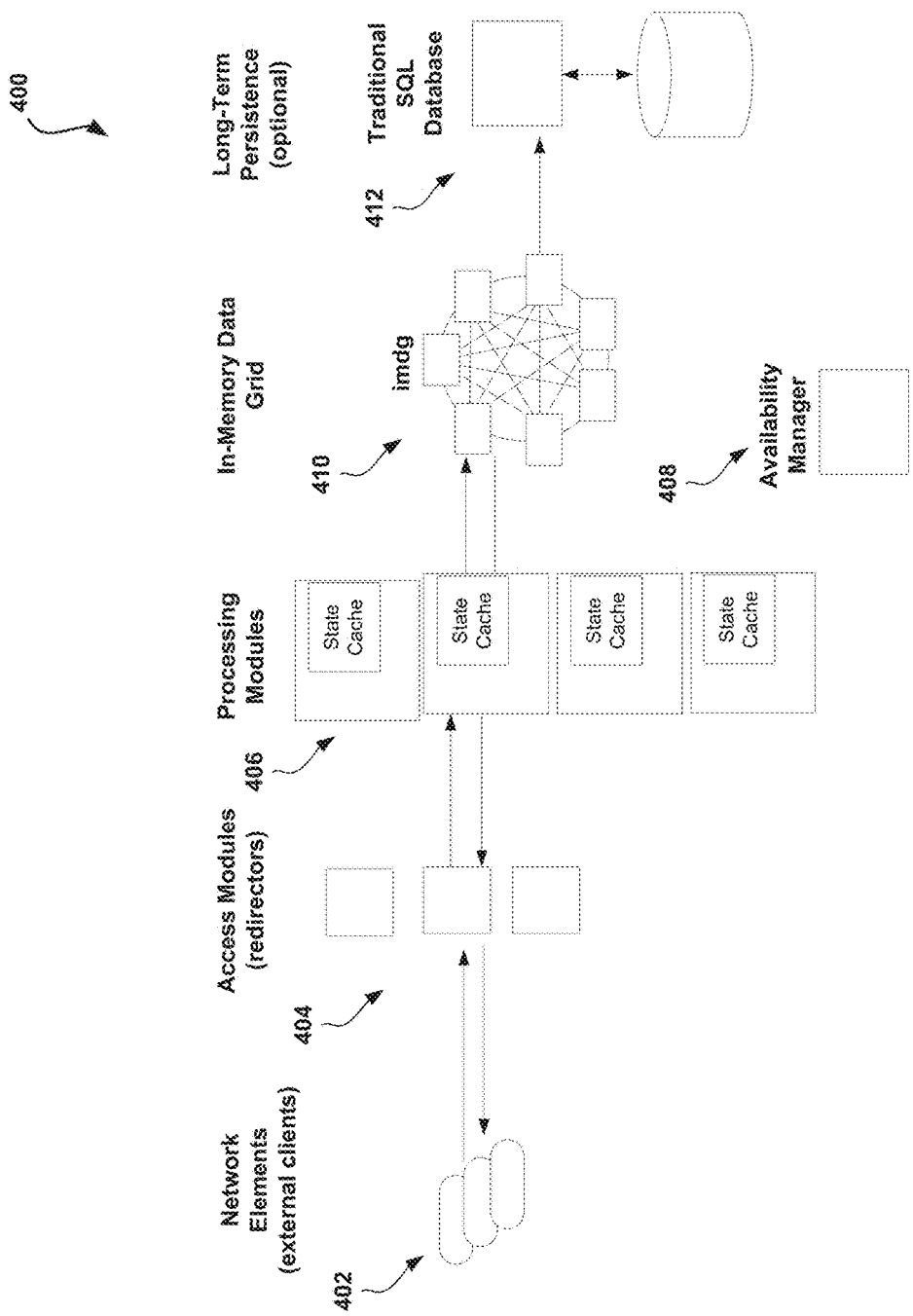
FIG. 4 illustrates a system for managing data objects in a multiprocessor unit telecommunications network, in accordance with one embodiment.

FIG. 4 illustrates a system 400 for managing data objects in a multiprocessor unit telecommunications network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

In operation, events may be generated by network elements 402 and may be sent to access servers 404 of the system 400. The access servers 404 may redirect the event to processing modules 406, based on a responsibility map that is maintained by an availability manager 408. The availability manager 408 may be responsible for distributing the responsibility map to all elements of the system 400.

Following each change in any of the object data (e.g. customer state, etc.), the objects may be stored in an In-Memory Data Grid (IMDG) 410. Once a success confirmation is received from the IMDG 410, the processing module 406 may send a response to the network element 402, via the access module 404. Finally, data may be persisted to a SQL database 412.

In one embodiment, the plurality of processing modules 406 may be utilized to allow for scalability. For example, the plurality of processing modules 406 may function to allow more processing power to serve a growing number of events (e.g. telephony customers, etc.) in terms of the processing power required, etc.

In addition, in one embodiment, the plurality of processing modules 406 may function to enable storing all data objects in RAM of a particular processing module 406. For example, when the number of customers grows beyond the memory size available at any one processing module, the population of data objects (e.g. customers, etc.) may be split, such that each processing module 406 is responsible for a known subset of the data objects (e.g. object group, etc.). In one embodiment, this responsibility may be dynamically managed by the availability manager 408.

In one embodiment, maintaining service continuity may be the responsibility of the availability manager 408. In this case, the availability manager 408 may accomplish this task by cooperating with agent software processes and with the application software processes running on the access modules 404 (e.g. servers) and the processing modules 406 (e.g. servers).

Specifically, the availability manager 408 may be responsible for monitoring a health of all elements in the system 400, and to take corrective actions when a failure occurs. For example, when a software or hardware failure is detected by the availability manager 408 as a result of monitoring tasks, the availability manager 408 may re-assign the responsibility previously owned by the failed element, to another, healthy, element.

In various embodiments, the availability manager 408 may use various techniques to monitor elements. For example, in one embodiment, the availability manager 408 may use heartbeat messages to monitor the elements in the system 400. For example, all monitored software processes in the system 400 may send periodic heartbeat messages to the availability manager 408. In one embodiment, after three missed heartbeat messages, the availability manager 408 may consider the monitored process as inactive and take the pre-configured recovery action for that process (e.g. transferring its processing responsibility to other processors, etc.).

In another embodiment, the availability manager 408 may use an external watchdog process to monitor the elements in the system 400. For example, each software process may be started by a watchdog process. In one embodiment, the watchdog process may not have any applicative function, other than waiting for the termination of the application process. For example, when the application process terminates (unexpectedly), the watchdog process may be notified by the operating system about its child process termination and notify the availability manager 408 about the failure.

In another embodiment, the availability manager 408 may use connection status reports to monitor elements in the system 400. For example, when an application process loses a connection to another application process, the availability manager 408 may notify the availability manager 408. In this case, when multiple reports pertaining to a specific target application process are received, the availability manager 408 may assume the application process has terminated or is inactive. In one embodiment, this technique may be implemented in cases of hardware failure, because, in such cases, both internal and external watchdog mechanisms may not work (as they expire with the failure of the machine).

In another embodiment, the availability manager 408 may use application level queries to monitor elements in the system 400. For example, when the availability manager 408 is in doubt as to the active state of any of the processes, the availability manager 408 may send a direct health-check message to the process and expect a response within a pre-defined time window (e.g. in the range of 100-300 milliseconds, etc.). If an answer is received within the pre-defined time window, the process may be assumed to be alive and healthy. If no answer is received for a number of consecutive queries (e.g. after three unanswered queries, etc.), the process may be assumed to be inactive, and another instance of the same application process may be started.

In another embodiment, the availability manager 408 may collect key performance indicators (KPIs) to monitor elements in the system 400. For example, the availability manager 408 may collect data about CPU load percentage, memory usage, and other hardware and software resources. In one embodiment, this data may be used for a responsibility re-assignment decision, using a dynamic re-assignment strategy.

For example, the availability manager 408 may implement a failure management and responsibility assignment/re-assignment strategy. In this case, processing responsibility may be assigned to each processing module 406 by the availability manager 408. Assigned responsibility may determine which data object groups (e.g. which population, etc.) the processing modules 406 are responsible.

In one embodiment, the responsibility map may be distributed to all elements of the system 400 by the availability manager 408 by sending a multi-cast message to a well-known, pre-configured port on each of the application servers. Using multi-cast messaging may function to ensure that the updated responsibility map arrives to all servers virtually at the same time.

The availability manager 408 may maintain the responsibility map utilizing different techniques. For example, in one embodiment, the availability manager 408 may send a static responsibility assignment. In this case, responsibilities for each of the data object groups may be pre-configured, and may be read by the availability manager 408 from a configuration database. Each data object group may have an assigned master event processing module 406 (e.g. a server, etc.), and one or more backup event processing module 406. Initially, if the master server is available, the availability manager 408 may assign it with the relevant responsibilities, as per the configuration.

In the case that the master fails, or when the operator manually re-assigns the master's responsibilities to another processing module 406 (e.g. in the case of a planned maintenance to the hardware, etc.), the availability manager 408 may publish a new responsibility map to all elements, re-assigning the current server's responsibility to one or more backup servers, based on the pre-configured table and based on the actual (current) availability of the master and the configured backup processes for that object group, in the system 400.

In another embodiment, the availability manager 408 may send a dynamic responsibility assignment. For example, the availability manager 408 may maintain a list of data object groups. The availability manager 408 may assign processing responsibility for object groups to the processing modules 406 by using a rule-based strategy. The rule-based strategy may take into account various parameters such as the hardware capacity of the processing modules 406, the current load experienced on each of the processing modules 406 (e.g. in terms of CPU utilization, memory utilization, and the current number of object groups already processed by the server, etc.), and the total number of available processing modules 406.

In the case that the master fails, or when the operator manually re-assigns responsibilities of the master to another of the processing modules 406 (e.g. in the case of a planned maintenance to the hardware), the availability manager 408 may publish a new responsibility map to all servers, re-assigning the responsibilities to one, or more, backup servers, based on its rule-based function, and taking into account the current load and availability data, as measured in real time. Further, in one embodiment, data object ownership may be maintained in the IMDG 410.

Figure 5:
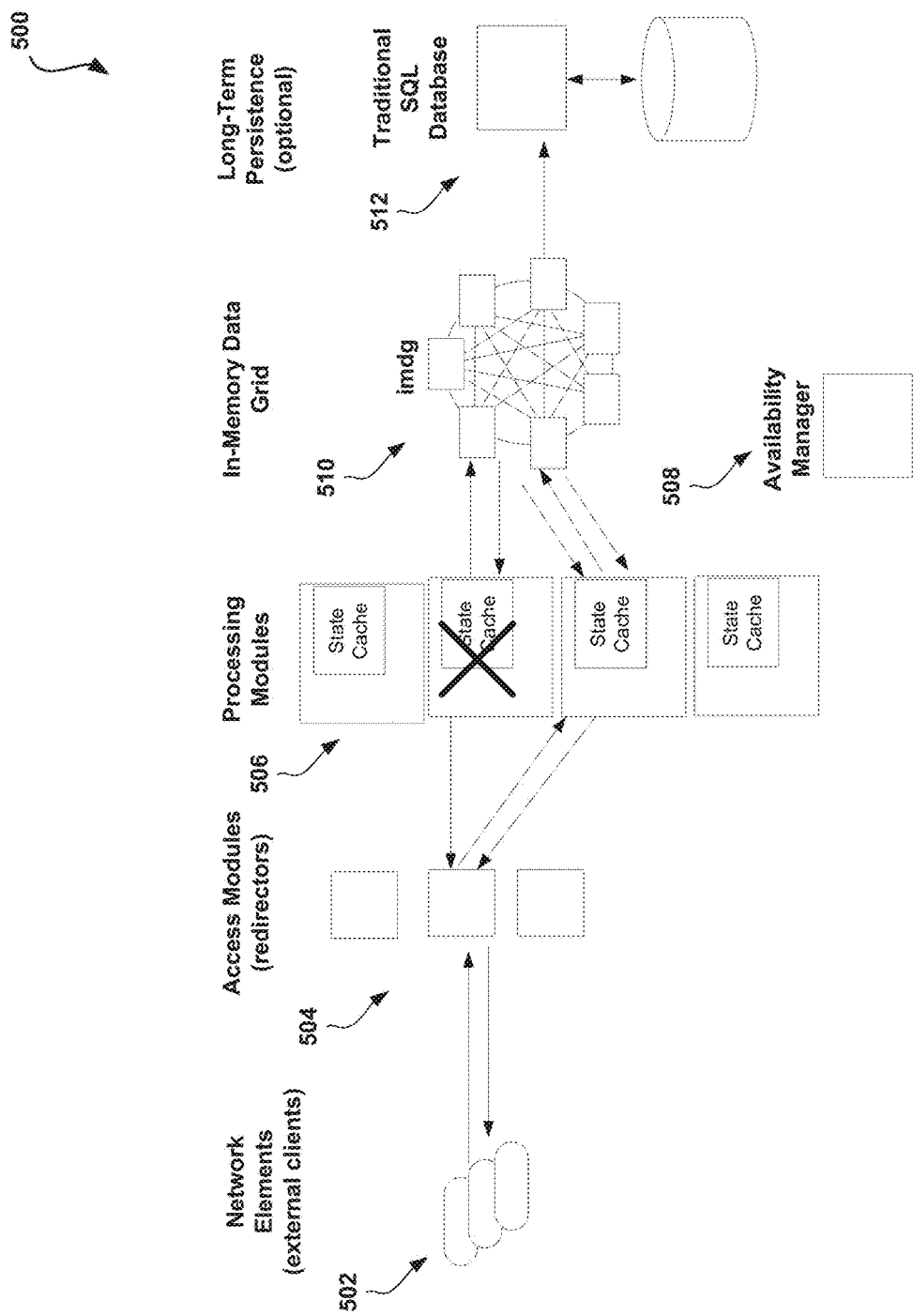
FIG. 5 illustrates a system for managing data objects in a multiprocessor unit telecommunications network, in accordance with one embodiment.

FIG. 5 illustrates a system 500 for managing data objects in a multiprocessor unit telecommunications network, in accordance with one embodiment. As an option, the system 500 may be implemented in the context of the details of FIGS. 1-4. Of course, however, the system 500 may be implemented in the context of any desired environment. Further, the aforementioned definitions may equally apply to the description below.

In operation, events may be generated by network elements 502 and may be sent to access servers 504 of the system 500. The access servers 504 may redirect the event to processing modules 506, based on a responsibility map that is maintained by an availability manager 508. The availability manager 508 may be responsible for distributing the responsibility map to all elements of the system 500.

Following each change in any of the object data (e.g. customer state, etc.), the objects may be stored in an IMDG 510. Once a success confirmation is received from the IMDG 510, the processing module 506 may send a response to the network element, via the access module 504. Finally, data may be persisted to a SQL database 512.

In order to maintain the system 500 availability, the processing responsibility of each the processing modules 506 can be moved (re-assigned) to another of the processing modules 506 by the availability manager 508. This may be done so that, in case of failure, or during planned maintenance of any of the processing modules 506, another of the processing modules 506 can be assigned the responsibility of the failed module, and be able to provide service to the affected population (object-group). FIG. 5 illustrates the rerouting of data objects as a result of a failure, in accordance with one embodiment.

When responsibility is re-assigned, and when the change is triggered as a result of human action (e.g. as opposed to a change forced on the system 500 as a result of a processing module failure), there is a need to make sure that all involved elements are in-sync, in order to prevent a possible case where two processing modules assume the same responsibility (due to a software bug, or some unexpected situation, etc.) and try to update the same object with conflicting data.

In order to ensure that object data is updated only by one processing module at any time, logic may be implemented in the IMDG 510 (e.g. in all servers comprising the IMDG grid, etc.).

Figure 6:
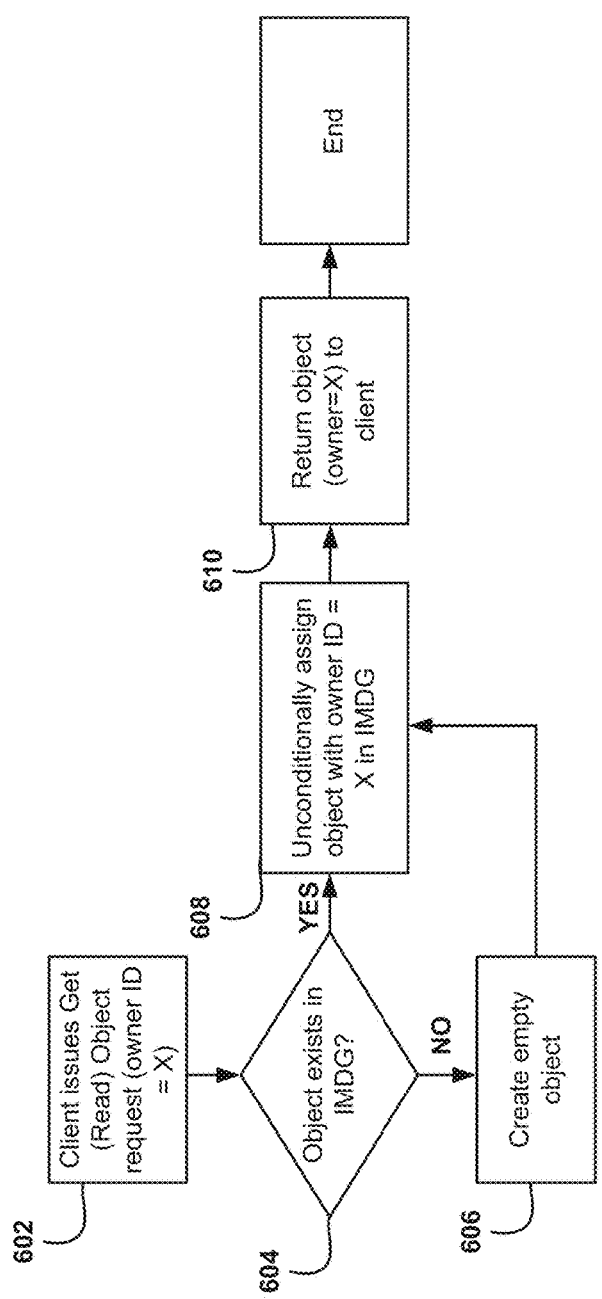
FIG. 6 illustrates a flowchart for an in-memory data grid, in accordance with one embodiment.

FIG. 6 illustrates a flowchart 600 for an in-memory data grid, in accordance with one embodiment. As an option, the flowchart 600 may be implemented in the context of the details of FIGS. 1-5. Of course, however, the flowchart 600 may be implemented in the context of any desired environment. Further, the aforementioned definitions may equally apply to the description below.

As shown, a client device issues a read data object request. See operation 602. In one embodiment, each data object may be marked with an Owner ID. In this case, the Owner ID may mark the identity of a processing module that is has been the last one to perform a "Get Object" operation on the data object.

Further, it is determined whether the data object exists in the IMDG. See determination 604. If the data object does not exist in the IMDG, an empty object is created. See operation 606.

If the data object exists in the IMDG, the IMDG unconditionally assigns the data object with an Owner ID associated with the processing module. See operation 608. The data object is then returned to the requesting client. See operation 610.

In operation, the IMDG will respect any "Get Object" (read semantics) operation, issued by a processing module. As shown in FIG. 6, each such "Get Object" operation results in an update to the Owner ID attribute of the object. The IMDG implementation may function to ensure that update of the object ownership is serialized such that there is not a case of two IMDG threads trying to change object ownership at the same time.

Figure 7:
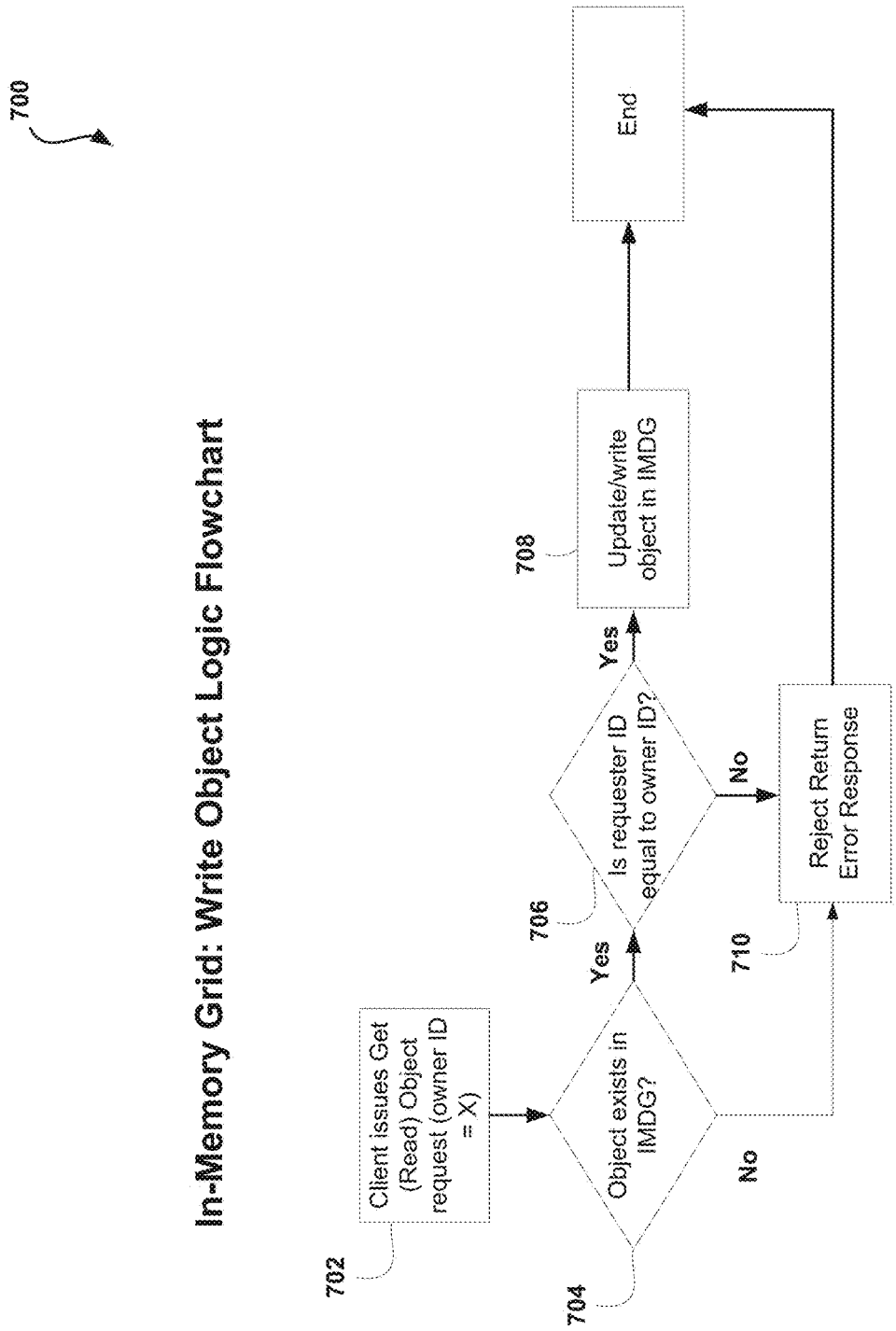
FIG. 7 illustrates a flowchart for an in-memory data grid, in accordance with another embodiment.

FIG. 7 illustrates a flowchart 700 for an in-memory grid, in accordance with another embodiment. As an option, the flowchart 700 may be implemented in the context of the details of FIGS. 1-6. Of course, however, the flowchart 700 may be implemented in the context of any desired environment. Further, the aforementioned definitions may equally apply to the description below.

As shown, a client device issues a read data object request. See operation 702. In one embodiment, each data object may be marked with an Owner ID. In this case, the Owner ID may mark the identity of a processing module that is has been the last one to perform a "Get Object" operation on the data object.

Further, it is determined whether the data object exists in the IMDG. See determination 704. If the data object does not exist in the IMDG, an error response may be returned. See operation 710.

If the data object exists in the IMDG, it is determined whether a Requester ID is equal to the Owner ID. See operation 706. If the requester ID is equal to the Owner ID, the data object is updated in, or written to, the IMDG. See operation 708.

In this way, the IMDG may accept any "Put Object" (write semantics) operation issued by a processing module that already owns the object being updated. Further, the IMDG may reject any "Put Object" (write semantics) operation issued by a processing module that is not already marked in IMDG as the current owner of the object.

When a "Put Object" operation is rejected due to a wrong ownership status, the processing module that issued the request may be expected to invalidate (delete) the relevant object's cached data from its RAM, and may also be expected to request a fresh copy of the object from the IMDG (e.g. because there is a chance that this object has been updated in IMDG by another processing module, etc.).

In one embodiment, IMDG servers need not be aware of the responsibility of any of the processing modules. For example, there may be no need to make sure that with every responsibility re-assignment all IMDG servers are notified and are in-sync. Thus, in one embodiment, following a failure or re-assignment operation at the processing modules, the new (re-assigned) processing module may automatically access all IMDG-stored objects belonging to its new responsibility.

Additionally, IMDG servers may not allow an un-authorized client (e.g. an event-server module that was not the last to read an object, etc.) to update that objects. Thus, data integrity of the objects may be preserved, as only the last reader is allowed to modify the object. Further, after a change of responsibility in a processing module, the IMDG may allow the old processing module to continue updates for data objects that used to be a responsibility of the module, as long as they were not claimed by another processing module. This may function to reduce the number of re-try operations in case of responsibility re-assignment in the processing module.

In one embodiment, responsibility assignment or re-assignment at a processing module may occur whenever new responsibility is assigned to the processing module. As an option, this may occur following a failure of another processing module, or when the operator wishes to change processing responsibilities of the servers (such as in planned maintenance) cases. This process may be triggered following the receipt of a new responsibility map (e.g. sent by an availability manager).

Acceptance of new responsibilities by a processing module may include various activities. For example, the processing module may detect the receipt of a new responsibility map (e.g. list, etc.). Further, the processing module may compare the new list of responsibility to its current (operational) list.

In this case, if the new responsibility map does not include any changes that affect its own responsibilities, no further action may be taken by the processing module. If the new responsibility map contains any changes that affect its own responsibilities, the processing module may update its own copy of the responsibility map to include new responsibilities such that each event that arrives and is related to the new responsibility will be processed.

In one embodiment, the processing of new responsibilities may include the processing module reading the object data from the IMDG. This "Get Object" operation may function to claim the ownership for this object. If the read is successful (e.g. this event-processing module is now the owner of the data, etc.), the processing module may update the data, per its rating/charging rules. Any following update operations issued by this processing module may be expected to be accepted (approved) by the IMDG, as this processing module is now the new owner of the data.

For removed responsibilities, in one embodiment, the processing module may update its own copy of the responsibility list. As a result, it may not be allowed to issue any "Get Object" requests for objects belonging to the removed responsibility.

In some cases, a processing module for which responsibility has been re-assigned away (e.g. to another processing module) may still receive some events for the removed responsibility population (e.g. because of timing issues, or full queues containing events sent before the responsibility change, etc.). For such events, the processing module may try to process them.

If a specific object ownership in the IMDG is still assigned to the current processing module, then any update operation following processing of events for that object may succeed. This may be done to minimize the amount of failed events and provide high response time to events that were sent to this event-processing module before the exact moment in time in which the responsibility has changed, but are actually processed by the event-processing module after the responsibility change has actually occurred.

However, if the update operation for these events is rejected by the IMDG because the ownership field on the object has been already modified by another processing module that had already claimed the ownership on this object, then the processing module may reject the current event. This event is not necessarily lost. For example, the event may be re-sent by a network element client and may be routed by access servers to the correct event-processing module, which is the processing module that has been assigned the responsibility for this object group according to the new responsibility assignment sent by the availability manager.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    computer code for identifying a plurality of data objects within a network;

computer code for assigning, within a responsibility map, each of the plurality of data objects to one of a plurality of processing modules;

computer code for distributing the responsibility map to each of the plurality of processing modules, where each of the plurality of processing modules use the responsibility map to determine the data objects assigned thereto and to process only events specific to the determined data objects;

computer code for monitoring the plurality of processing modules;

computer code for determining whether each of the plurality of processing modules is available to process the events specific to the data objects assigned thereto, based on the monitoring;

computer code for automatically reassigning, within the responsibility map, at least one first data object of the plurality of data objects that are assigned to a first processing module of the plurality of processing modules to a second processing module of the plurality of processing modules, in response to determining the first processing module of the plurality of processing modules is not available to process the events specific to the at least one first data object of the plurality of data objects assigned thereto and that the second processing module of the plurality of processing modules is available to process the events specific to the at least one first data object of the plurality of data objects; and computer code, responsive to the automatic reassigning within the responsibility map, for distributing the responsibility map having the reassignment to each of the plurality of processing modules, where each of the plurality of processing modules use the responsibility map having the reassignment to determine the data objects assigned thereto and to process only events specific to the determined data objects;

storing, by a server, in an In-Memory Data Grid (IMDG):
the plurality of data objects, and
for each of the plurality of data objects, an indicator of an owner of the data object, the owner being a last one of the plurality of processing modules to perform a read operation on the data object;

wherein the second processing module, responsive to receiving the responsibility map having the reassignment:
identifies from the responsibility map the at least one first data object of the plurality of data objects that has been reassigned to the second processing module, and
automatically reads the at least one first data object of the plurality of data objects, to cause the indicator of the owner of the at least one first data object in the IMDG to be updated to be an identifier of the second processing module;

utilizing the IMDG to control, by the server, modifications to the data objects by the processing modules including, for each of the data objects, only permitting the owner of the data object, as indicated by the indicator of the owner stored by the IMDG for the data object, to modify the data object.

2. The computer program product of claim 1, wherein the computer program product is operable such that monitoring the plurality of processing modules includes monitoring each of the plurality of processing modules for at least one failure.

3. The computer program product of claim 1, wherein the computer program product is operable such that monitoring the plurality of processing modules includes monitoring heartbeat messages associated with each of the plurality of processing modules.

4. The computer program product of claim 1, wherein the computer program product is operable such that monitoring the plurality of processing modules includes monitoring applications associated with each of the plurality of processing modules for unexpected termination.

5. The computer program product of claim 1, wherein the computer program product is operable such that monitoring the plurality of processing modules includes monitoring connection status reports associated with each of the plurality of processing modules.

6. The computer program product of claim 5, wherein the computer program product is operable such that if multiple connection status reports associated with one of the plurality of processing modules are received, determining that the one of the plurality of processing modules has failed.

7. The computer program product of claim 1, wherein the computer program product is operable such that monitoring the plurality of processing modules includes sending a direct health-check message to one of the plurality of processing modules.

8. The computer program product of claim 7, wherein the computer program product is operable such that if the one of the plurality of processing modules fails to respond to the direct health-check message within a predefined period of time, determining the one of the plurality of processing modules is inactive.

9. The computer program product of claim 1, wherein the computer program product is operable such that determining the first processing module of the plurality of processing modules is not available to process the events specific to the at least one first data object of the plurality of data objects assigned thereto includes determining that the first processing module of the plurality of processing modules is too busy to process the events specific to the at least one first data object of the plurality of data objects assigned thereto.

10. The computer program product of claim 9, wherein the computer program product is operable such that determining that the first processing module of the plurality of processing modules is too busy to process the events specific to the at least one first data object of the plurality of data objects assigned thereto is in response to monitoring a load percentage and a memory usage associated with the first processing module of the plurality of processing modules.

11. The computer program product of claim 1, further comprising computer code for maintaining at least one memory including the plurality of data objects.

12. A method, comprising:
identifying a plurality of data objects within a network;
assigning, within a responsibility map, each of the plurality of data objects to one of a plurality of processing modules;
distributing the responsibility map to each of the plurality of processing modules, where each of the plurality of processing modules use the responsibility map to determine the data objects assigned thereto and to process only events specific to the determined data objects;
monitoring the plurality of processing modules;
determining whether each of the plurality of processing modules is available to process the events specific to the data objects assigned thereto, based on the monitoring;
automatically reassigning, within the responsibility map, at least one first data object of the plurality of data objects that are assigned to a first processing module of the plurality of processing modules to a second processing module of the plurality of processing modules, in response to determining the first processing module of the plurality of processing modules is not available to process the events specific to the at least one first data object of the plurality of data objects assigned thereto and that the second processing module of the plurality of processing modules is available to process the events specific to the at least one first data object of the plurality of data objects; and responsive to the automatic reassigning within the responsibility map, distributing the responsibility map having the reassignment to each of the plurality of processing modules, where each of the plurality of processing modules use the responsibility map having the reassignment to determine the data objects assigned thereto and to process only events specific to the determined data objects;

storing, by a server, in an In-Memory Data Grid (IMDG):
   the plurality of data objects, and
   for each of the plurality of data objects, an indicator of an owner of the data object, the owner being a last one of the plurality of processing modules to perform a read operation on the data object;

wherein the second processing module, responsive to receiving the responsibility map having the reassignment:
   identifies from the responsibility map the at least one first data object of the plurality of data objects that has been reassigned to the second processing module, and
   automatically reads the at least one first data object of the plurality of data objects, to cause the indicator of the owner of the at least one first data object in the IMDG to be updated to be an identifier of the second processing module;

utilizing the IMDG to control, by the server, modifications to the data objects by the processing modules including, for each of the data objects, only permitting the owner of the data object, as indicated by the indicator of the owner stored by the IMDG for the data object, to modify the data object.

13. A system comprising:
a memory system; and
one or more processing cores coupled to the memory system and that are each configured to:
   identify a plurality of data objects within a network;
   assign, within a responsibility map, each of the plurality of data objects to one of a plurality of processing modules;
   distribute the responsibility map to each of the plurality of processing modules, where each of the plurality of processing modules use the responsibility map to determine the data objects assigned thereto and to process only events specific to the determined data objects;
   monitor the plurality of processing modules;
   determine whether each of the plurality of processing modules is available to process the events specific to the data objects assigned thereto, based on the monitoring;
   automatically reassign, within the responsibility map, at least one first data object of the plurality of data objects that are assigned to a first processing module of the plurality of processing modules to a second processing module of the plurality of processing modules, in response to determining the first processing module of the plurality of processing modules is not available to process the events specific to the at least one first data object of the plurality of data objects assigned thereto and that the second processing module of the plurality of processing modules is available to process the events specific to the at least one first data object of the plurality of data objects; and
responsive to the automatic reassigning within the responsibility map, distribute the responsibility map having the reassignment to each of the plurality of processing modules, where each of the plurality of processing modules use the responsibility map having the reassignment to determine the data objects assigned thereto and to process only events specific to the determined data objects;
store in an In-Memory Data Grid (IMDG):
   the plurality of data objects, and
   for each of the plurality of data objects, an indicator of an owner of the data object, the owner being a last one of the plurality of processing modules to perform a read operation on the data object;
wherein the second processing module, responsive to receiving the responsibility map having the reassignment:
   identifies from the responsibility map the at least one first data object of the plurality of data objects that has been reassigned to the second processing module, and
   automatically reads the at least one first data object of the plurality of data objects, to cause the indicator of the owner of the at least one first data object in the IMDG to be updated to be an identifier of the second processing module;
utilize the IMDG to control modifications to the data objects by the processing modules including, for each of the data objects, only permitting the owner of the data object, as indicated by the indicator of the owner stored by the IMDG for the data object, to modify the data object.

* * * * *